Patented Aug. 29, 1944

2,357,221

UNITED STATES PATENT OFFICE 2,357,221

ALKYD RESIN AS PLASTICIZER

Carl Opp, Cincinnati, Ohio, assignor to Interchemical Corporation, New York, N. Y., a corporation of Ohio No Drawing. Application July 27, 1943, Serial No. 496,311

1 Claim. (Cl. 260—75)

This invention relates to a resinous plasticizer for cellulose organic esters such as cellulose acetate and cellulose aceto-propionate, and aims to provide a solvent plasticizer for this type of cellulose ester, characterized by the high film strength of the resultant film.

As is well known to the art, there are relatively few solvent plasticizers for cellulose acetate, and the mixed ester obtained from cellulose with acetic acid and other lower fatty acids. It is particularly difficult to obtain an economical plasticizer from which high film strength films can be made. This is particularly true in the production of plasticizers for the manufacture of films which can be stripped from supports. I have discovered that a solvent plasticizer for celluose acetate and the like films, which yields films of exceptionally high film strength, can be made by reacting about—

| | Per cent |
|---|---|
| Sebacic acid | 37.5 |
| With | |
| Succinic anhydride | 28.6 |
| Ethylene glycol | 19.3 |
| Glycerol | 14.6 |

Preferably, the reaction is conducted at a relatively high temperature, of the order of 400° F., until after some hours an acid number of about 70 is obtained, which represents substantially completed reaction with the indicated proportions.

The proportions used appear to be rather critical for the production of a plasticizer which will yield high film strength materials. If the indicated proportions are varied by more than about 2 or 3%, the desirable high film strength is not obtained.

Typical of the use of the above product as a plasticizer is the following:

| | Parts by weight |
|---|---|
| Hercose AP (cellulose aceto-propionate—low viscosity, 15% acetyl, 31% propionyl content) | 7.35 |
| Resin above | 7.35 |
| Ethyl acetate | 35.30 |
| Butyl acetate | 45.00 |
| Cellosolve acetate | 5.00 |

This lacquer produces a film of exceptionally high film strength.

Obviously, examples can be multiplied indefinitely without departing from the scope of the invention, which is defined in the claim.

I claim:

As a plasticizer for cellulose acetate, cellulose aceto-propionate, and the like, the resinous reaction product of approximately 37.5% sebacic acid, 28.6% succinic anhydride, 19.3% ethylene glycol, and 14.6% glycerol.

CARL OPP.